(12) United States Patent
Aigner et al.

(10) Patent No.: US 12,187,122 B2
(45) Date of Patent: Jan. 7, 2025

(54) FUNCTIONAL MODULE FOR A VEHICLE INTERIOR TRIM, INTERIOR TRIM, AND MOTOR VEHICLE

(71) Applicant: Bayerische Motoren Werke Aktiengesellschaft, Munich (DE)

(72) Inventors: Ralf Aigner, Ergolding (DE); Joachim Melzig, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 338 days.

(21) Appl. No.: 17/707,156

(22) Filed: Mar. 29, 2022

(65) Prior Publication Data

US 2022/0314803 A1    Oct. 6, 2022

(30) Foreign Application Priority Data

Mar. 30, 2021   (DE) .................. 10 2021 108 089.4

(51) Int. Cl.
*B60K 35/10*     (2024.01)
*B60R 13/02*     (2006.01)

(52) U.S. Cl.
CPC .............. *B60K 35/10* (2024.01); *B60R 13/02* (2013.01); *B60K 2360/143* (2024.01); *B60R 2013/0287* (2013.01)

(58) Field of Classification Search
CPC .............. B60K 35/10; B60K 2306/143; B60K 2360/141; B60K 2306/1434; B60R 13/02; B60R 2013/0287; B60R 13/0256; B60R 16/02; G06F 3/04883
See application file for complete search history.

(56) References Cited

U.S. PATENT DOCUMENTS

| | | | |
|---|---|---|---|
| 2015/0103028 A1 | 4/2015 | Ruemelin et al. | |
| 2016/0185267 A1* | 6/2016 | Nahman | B60K 35/50 701/36 |
| 2017/0364183 A1* | 12/2017 | Xiao | G06F 3/0412 |
| 2018/0037174 A1 | 2/2018 | Seegers et al. | |
| 2019/0286274 A1* | 9/2019 | Koehnlein | G06F 3/0488 |
| 2020/0139816 A1* | 5/2020 | Carvalho | H03K 17/962 |
| 2020/0247316 A1 | 8/2020 | Peng | |
| 2021/0188092 A1* | 6/2021 | Peterson | H03K 17/962 |

FOREIGN PATENT DOCUMENTS

| | | | | |
|---|---|---|---|---|
| CN | 104010882 A | * | 8/2014 | ............ B32B 5/022 |
| CN | 111516617 A | | 8/2020 | |
| CN | 113002445 A | * | 6/2021 | |
| DE | 10 2009 004 985 A1 | | 7/2010 | |

(Continued)

OTHER PUBLICATIONS

English Translation of KR-20180081298-A (Year: 2018).*

(Continued)

*Primary Examiner* — Lori Lyjak
(74) *Attorney, Agent, or Firm* — Crowell & Moring LLP

(57) ABSTRACT

A functional module for a vehicle interior trim has a substrate layer, at least one detection layer, which is arranged above the substrate layer and is designed to generate a signal on the approach, such as the proximity and/or touch of a user, and a decorative layer, which is arranged above the detection layer. An interior trim and a motor vehicle have at least one such functional module.

8 Claims, 1 Drawing Sheet

(56) References Cited

FOREIGN PATENT DOCUMENTS

| | | |
|---|---|---|
| DE | 10 2012 211 163 A1 | 6/2014 |
| DE | 10 2015 118 531 A1 | 5/2017 |
| DE | 10 2016 114 272 A1 | 2/2018 |
| DE | 20 2019 106 523 U1 | 1/2020 |
| DE | 10 2020 100 678 A1 | 8/2020 |
| EP | 3254882 A2 * 12/2017 | ............ B60K 37/06 |
| KR | 20180081298 A * 7/2018 | |

OTHER PUBLICATIONS

German-language Search Report issued in German Application No. 10 2021 108 089.4 dated Jan. 20, 2022 with partial English translation (11 pages).

* cited by examiner

FUNCTIONAL MODULE FOR A VEHICLE INTERIOR TRIM, INTERIOR TRIM, AND MOTOR VEHICLE

CROSS REFERENCE TO RELATED APPLICATION

This application claims priority under 35 U.S.C. § 119 from German Patent Application No. 10 2021 108 089.4, filed Mar. 30, 2021, the entire disclosure of which is herein expressly incorporated by reference.

BACKGROUND AND SUMMARY OF THE INVENTION

The invention relates to a functional module for a vehicle interior trim. The invention also relates to an interior trim and to a motor vehicle having such a functional module.

Conventional switches, such as keys or buttons, must be incorporated in a panel, such as a door panel, central panel or instrument panel, of a motor vehicle in a separate mounting process, as a result of which it is possible that the production process is time-consuming and individual and/or demand-oriented functions for individual users are difficult to implement.

To some extent, conventional keys or buttons have now been replaced by touch-sensitive screens, such as touchscreens. Document DE 10 2012 211 163 A1 discloses, for example, a touch-sensitive panel which is configured to determine the location at which a user's finger touches the panel and to activate a function in response to detecting a movement of the finger that crosses a tactile threshold. However, touch-sensitive screens can be incorporated into an interior trim of a motor vehicle only very awkwardly or with great difficulty. Moreover, it can be difficult for a user to notice or operate all of the functions of a screen application.

The invention is based on the object of improving the structure and/or function of a functional module mentioned at the outset for a vehicle interior trim. The invention is also based on the object of improving the structure and/or function of an interior trim mentioned at the outset for a motor vehicle and those of a motor vehicle.

A functional module for a vehicle interior trim, such as a motor vehicle interior trim, may be an approach and/or touch module. The approach module may be a proximity module.

The functional module may comprise a substrate layer or a substrate. The substrate layer or the substrate may form a support body. The substrate layer may be flexible. The substrate layer may be produced from a plastics material or synthetic material. The substrate layer may have a thickness of between approximately 0.5 mm and 5 mm, for example a thickness of 1 mm or 2 mm. The substrate layer may be a film, such as a substrate film. The substrate layer may have a 2D or 3D form/structure. The substrate layer may have been or be incorporated in an interior trim, such as a vehicle interior trim.

The functional module may comprise at least one detection layer. The at least one detection layer may be an approach layer, such as a proximity layer or approach (proximity) detection layer, and/or a touch layer, such as a touch detection layer. The at least one detection layer may be a touch-sensitive layer. The at least one detection layer may be an approach-sensitive/proximity-sensitive layer. The at least one detection layer may be arranged above the substrate layer. The at least one detection layer may be designed to generate a signal on the approach, such as the proximity, and/or touch of a user, for example of the user's finger or hand. The user may be the driver, the front passenger or another passenger of the vehicle. The at least one detection layer may be flexible. The at least one detection layer may be a film, such as a detection-layer film. The at least one detection layer may have a thickness of between approximately 0.1 mm and 3 mm, for example a thickness of 0.5 mm or 1 mm. The at least one detection layer may have a 2D or 3D form/structure. The at least one detection layer may comprise or be at least one approach and/or touch sensor, in particular a capacitive sensor and/or resistance sensor and/or piezoelectric sensor. The approach sensor may be a proximity sensor.

The functional module may comprise multiple, such as two, three or more, detection layers. The multiple detection layers may be arranged spaced apart from one another. Other layers, such as filling layers, foam layers or the like, may be arranged between the multiple detection layers. These other layers may be flexible.

The functional module may comprise a decorative layer. The decorative layer may be arranged above the detection layer. At least certain portions of the decorative layer may be transparent or semitransparent. The decorative layer may be designed such that light can pass or shine through the decorative layer. The decorative layer may comprise one or more characters or symbols applied to, such as printed on, an outer surface of the decorative layer. The decorative layer may comprise one or more decorative buttons, which in particular are incorporated into the decorative layer, for example are attached or adhesively bonded to the outer surface of the decorative layer. Each character, symbol or decorative button may have been or be assigned a specific or any desired or a predefined function, such as a vehicle function, or an electronic component of the vehicle that is to be correspondingly controlled. The decorative layer may have a thickness of between approximately 0.1 mm and 3 mm, for example a thickness of 0.5 mm or 1 mm. The decorative layer may be flexible. The decorative layer may be the outer surface layer of the vehicle interior trim and/or may form it at least in certain portions. The decorative layer may form the vehicle interior trim at least in certain portions. The decorative layer may have a planar or curved, such as convex and/or concave, form. The decorative layer may have a 2D or 3D form/structure. The decorative layer may be a film, such as a decorative film. The decorative layer may be produced from plastics material, for example thermoplastic material, such as thermoplastic polyolefins (TPO), thermoplastic polyurethane (TPU) or polyvinyl chloride (PVC), artificial leather, leather, textiles, wood, molded skins or sprayed skins, such as polyurethane (PUR) sprayed skins, IMC ("in mold coating") sprayed skins or PVC sprayed skins. The decorative layer may, for example, have been or be connected to a sewn covering or, for example, be finished by sewing, adhesive bonding and/or laminating to form a sewn covering.

A processing device may be provided. The functional module may comprise a processing device. The processing device may have been or be electrically connected/coupled to the at least one detection layer. The processing device may have been or be connected/coupled to at least one electrical element for the motor vehicle. The processing device may be designed to control the at least one electrical element in a manner corresponding to a received signal generated by the at least one detection layer. The at least one electrical element may be a switch or actuator or sensor or an illumination means. The at least one electrical element may be or may be part of a ventilation system, audio system, screen display system, window, such as a window switch, seat, such as a seat switch, or the like. The processing device may comprise a computing unit and/or a memory. The processing device may comprise a computer program/software program or be designed to execute a computer program/software program. The processing device may comprise or be a control unit. The processing device may have or initiate different functions. The processing device may be a processing module. The processing module may have been or be electrically connected/coupled to the functional module, in particular to a detection layer and/or illumination layer of the functional module. The processing device may be attached to the substrate layer, for example underneath and/or directly to the substrate layer. The processing device may be incorporated into the detection layer or substrate layer. The processing device may be a processing layer. The processing layer may comprise corresponding electronics for processing. The processing layer may be arranged between the substrate layer and the detection layer or underneath the substrate layer.

The functional module may comprise at least one illumination layer. The at least one illumination layer may be arranged between the at least one detection layer and the decorative layer. At least certain portions of the decorative layer may be transparent or semitransparent, with the result that light from the at least one illumination layer can pass or shine through the decorative layer. The at least one illumination layer may comprise at least one light source. The at least one light source may be an incandescent lamp, fluorescent lamp, illuminating diode, light guide or a light-emitting element or a light-emitting diode. The at least one light source may for example be a flexible light diode, such as a semiconductor light-emitting diode. The at least one illumination layer may transmit light of one color or of different colors. The at least one illumination layer may have a thickness of between approximately 1 mm and 5 mm, for example a thickness of 2 mm or 3 mm. The at least one illumination layer may have a 2D or 3D form/structure. The at least one illumination layer may be flexible. The at least one illumination layer may be a film, such as an illumination-layer film.

The at least one illumination layer may have been or be electrically connected/coupled to the processing device. The processing device may be designed to control the at least one illumination layer in a manner corresponding to a received signal generated by the at least one detection layer. The at least one illumination layer may transmit a certain color and/or brightness and/or frequency and/or duration of the light to be transmitted on the basis of the signal from the processing device and/or from the at least one detection layer. The processing device may be designed to control the color and/or brightness and/or frequency and/or duration of the light to be transmitted of the at least one illumination layer on the basis of the received signal generated by the at least one detection layer.

The at least one detection layer may be designed to generate a first signal on the approach or proximity of the user, for example the user's finger and/or hand, and/or to generate a second signal on the touch and/or further approach or closer proximity of the user. The first signal may be generated when a predefined first distance, such as a first minimum distance, between the user, for example the user's finger and/or hand, and the decorative layer or detection layer is reached or gone beyond. The second signal may be generated when a predefined second distance, such as a second minimum distance, between the user, for example the user's finger and/or hand, and the decorative layer or detection layer is reached or gone beyond. The second distance may be smaller than the first distance. The second signal may be generated when the user, for example the user's finger and/or hand, touches the decorative layer.

The processing device may be designed to control the at least one illumination layer in a manner corresponding to the received first signal generated by the at least one detection layer. The processing device may be designed to control the at least one electrical element of the motor vehicle in a manner corresponding to the received second signal generated by the at least one detection layer.

The functional module and/or its detection layer and/or illumination layer may comprise or be printed electronics. The decorative layer, the at least one illumination layer, the at least one detection layer and/or the substrate layer may have a flexible design and/or may be part of an interior trim, such as a vehicle interior trim, and/or have been or be fitted, sewed, adhesively bonded or laminated into the interior trim or into parts of the interior trim.

An interior trim for a motor vehicle may comprise at least one functional module for the vehicle interior trim. The at least one functional module may be designed as described above and/or subsequently. The at least one functional module may have been or be incorporated in the interior trim and/or in a part of a motor vehicle and/or may have been or be flexibly attached there. The interior trim and/or the at least one functional module may have a particular contour or 2D form/structure or 3D form/structure. The interior trim may have a planar or curved, such as convex and/or concave, form. The interior trim may be produced from or comprise plastics material, for example thermoplastic material, such as thermoplastic polyolefins (TPO), thermoplastic polyurethane (TPU) or polyvinyl chloride (PVC), artificial leather, leather, textiles, wood, molded skins or sprayed skins, such as polyurethane (PUR) sprayed skins, IMC ("in mold coating") sprayed skins or PVC sprayed skins. The interior trim may be produced by means of or comprise a sewn covering, for example. The interior trim may be produced by sewing, adhesive bonding, laminating and/or by a plastics processing method, such as an injection molding and/or reaction method, such as RTM method or spraying method, e.g. polyurethane spraying method, or the like. The interior trim may be a panel, such as an instrument panel, a door, an armrest, a vehicle seat, a central console or the like, or may be intended therefor. The interior trim may be flexible or rigid. The interior trim and/or the decorative layer may comprise or generate certain haptics. The interior trim may be an interior component of a vehicle.

A vehicle, such as a motor vehicle, may comprise at least one functional module for the vehicle interior trim and/or an interior trim. The at least one functional module and/or the interior trim may be designed as described above and/or subsequently.

To summarize, and in other words, the invention thus results, inter alia, in a surface functional module, such as a functional module, in particular for automotive interior applications. The surface functional module may be incorporated in a sewn covering. There may be functional incorporation into surfaces or decorative elements for interior components, such as light, sensor systems or haptics. Electronic functions may have been or be incorporated on thin materials, such as artificial leather, leather, textiles and molded skins, which may be transparent, partially transparent or not transparent, for example by means of printed electronics. These materials with incorporated electronics and/or light, in blanks of 2D/3D elements of a variety of materials, such as TPO, TPU, PVC, artificial leather, PVC artificial leather, leather, PUR sprayed skin, IMC sprayed skin or PVC molded skin, may be finished by, for example, sewing, adhesive bonding or laminating to form sewn coverings. If a user's hand approaches, for example, a symbol on the decorative layer/surface may have been or be illuminated. If then the now-illuminated symbol is touched, or a further approach is made or closer proximity is reached with respect to the illuminated symbol, the assigned function may be triggered.

The invention makes it possible to optimize, simplify and/or accelerate the production process. A separate mounting process for a conventional switch or key can be dispensed with. Conventional switches or keys are no longer necessary. The function of such a conventional switch or key can be visibly or non-visibly incorporated fully into an interior trim. Individual and/or demand-oriented functions for individual users can be easily realized. Operating comfort can be improved and/or increased.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
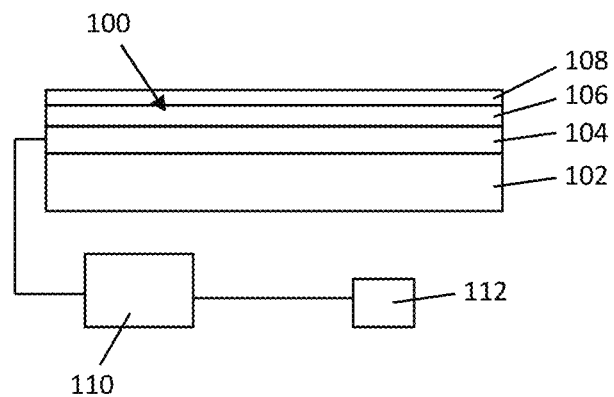
FIG. 1 is a schematic block diagram of an exemplary functional module for a vehicle interior trim.

FIG. 1 schematically shows a functional module 100 for a vehicle interior trim. The functional module 100 comprises a substrate layer 102, at least one detection layer 104, at least one illumination layer 106 and a decorative layer 108.

The detection layer 104 is arranged above the substrate layer 102 and is designed to generate a signal on the approach, such as the proximity, and/or touch of a user, in particular of the user's finger or hand. The decorative layer 108 is arranged above the detection layer 104. The illumination layer 106 is arranged between the detection layer 104 and the decorative layer 108. The substrate layer 102, detection layer 104, illumination layer 106 and decorative layer 108 are connected, for example adhesively bonded or laminated, to one another, preferably over their surface area. At least certain portions of the decorative layer 108 have a transparent or semitransparent design, with the result that light from the illumination layer 106 can pass or shine through the decorative layer.

Also provided is a processing device 110, which is electrically connected to the detection layer 104 and to at least one electrical element 112 for a motor vehicle. The at least one electrical element 112 may be a switch or actuator or sensor or an illumination means of a motor vehicle. For example, the at least one electrical element 112 may be or may be part of a ventilation system, audio system, screen display system, window, such as a window switch, seat, such as a seat switch, or the like. The processing device may comprise a computing unit and/or a memory.

The processing device 110 is also electrically connected to the illumination layer 106, the processing device 110 being designed to control the color and/or brightness and/or frequency and/or duration of the light to be transmitted of the illumination layer 106 on the basis of a received signal generated by the detection layer 104.

The detection layer 104 may comprise or be in the form of at least one approach and/or touch sensor, for example a capacitive sensor and/or resistance sensor. In the present example, the detection layer 104 is designed to generate a first signal on the approach, such as the proximity, of the user, for example the user's finger, and to generate a second signal on the touch and/or further approach, such as the closer proximity, of the user. The processing device 110 is designed to control the illumination layer 106 in a manner corresponding to the received first signal generated by the detection layer 104, with a light and/or a, e.g. illuminated, symbol being displayed on the decorative layer 108, for example. The processing device 110 is also designed to control the at least one electrical element 112 of the motor vehicle in a manner corresponding to the received second signal generated by the at least one detection layer, with the at least one electrical element 112 being switched on or off and/or being activated or deactivated, for example.

Figure 2:
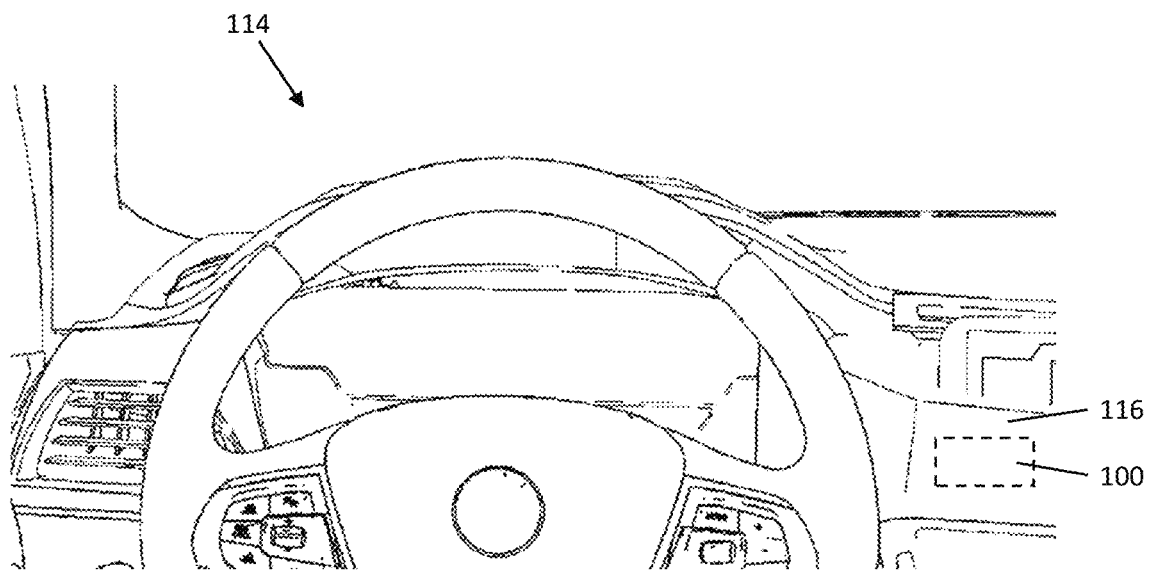
FIG. 2 illustrates a vehicle with an interior trim having a functional module according to FIG. 1.

FIG. 2 schematically shows a vehicle 114, such as a motor vehicle, having at least one interior trim 116, such as a vehicle interior trim, which comprises at least one functional module 100. The at least one interior trim 116 and/or the at least one functional module 100 is/are designed as described above and/or subsequently. The at least one functional module 100 is incorporated into the interior trim 116, for example seamlessly. The decorative layer 108 of the at least one functional module 100 forms the surface of the interior trim 116 at least in certain portions, with certain haptics being created.

Furthermore, supplementary reference is made in particular to FIG. 1 and the associated description.

"May" or "can" in particular denotes optional features of the invention. Accordingly, refinements and/or exemplary embodiments of the invention that additionally or alternatively comprise the respective feature or the respective features are also provided.

It is also possible as required to extract features in isolation from the combinations of features disclosed above and to use them in combination with other features to delimit the subject matter of the claims by defining a structural and/or functional relationship that may exist between the features.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SIGNS

100 Functional module
102 Substrate layer
104 Detection layer
106 Illumination layer
108 Decorative layer
110 Processing device
112 Electrical element
114 Vehicle
116 Interior trim

What is claimed is:

1. A functional module for a vehicle interior trim, comprising:
   a flexible substrate layer;
   at least one detection layer, which is arranged above the substrate layer and is designed to generate a signal on approach of a user;
   a decorative layer, which is arranged above the detection layer
   at least one illumination layer, which is arranged between the at least one detection layer and the decorative layer;
   a processor, which is electrically connected to the at least one detection layer, to the illumination layer, and to at least one electrical element for a motor vehicle, wherein
   the at least one detection layer is designed to generate a first signal on the approach of the user, and to generate a second signal on a further approach of the user, and
   the processor is designed to control the at least one illumination layer in a manner corresponding to the first signal generated by the at least one detection layer, and is designed to control the at least one electrical element of the motor vehicle in a manner corresponding to the second signal generated by the at least one detection layer.

2. The functional module according to claim 1, wherein the first signal is generated based on a proximity of the user and the second signal is based on a touch of the user.

3. The functional module according to claim 1, wherein at least certain portions of the decorative layer are transparent or semitransparent.

4. The functional module according to claim 1, wherein the at least one detection layer comprises at least one approach and/or touch sensor.

5. The functional module according to claim 4, wherein the at least one approach and/or touch sensor is a capacitive sensor and/or a resistance sensor.

6. An interior trim for a motor vehicle comprising at least one functional module for the vehicle interior trim according to claim 1.

7. A motor vehicle comprising at least one functional module for a vehicle interior trim according to claim 6.

8. A motor vehicle comprising:
   an interior trim; and
   at least one functional module for the vehicle interior trim according to claim 1.

* * * * *